(12) United States Patent
Chochoy et al.

(10) Patent No.: US 6,774,511 B2
(45) Date of Patent: Aug. 10, 2004

(54) ROTARY ELECTRIC MACHINE AND METHOD FOR MAKING WINDINGS

(75) Inventors: Jean-Pierre Chochoy, Cremarest (FR); Francis Framery, Saint Josse s/mer (FR); Arnaud Laxenaire, le Touquet (FR)

(73) Assignee: Valeo Equipements Electriques Moteur, Creteil (FR)

( * ) Notice: Subject to any disclaimer, the term of this patent is extended or adjusted under 35 U.S.C. 154(b) by 67 days.

(21) Appl. No.: 10/031,393

(22) PCT Filed: May 29, 2001

(86) PCT No.: PCT/FR01/01653

§ 371 (c)(1),
(2), (4) Date: Jan. 18, 2002

(87) PCT Pub. No.: WO01/93406

PCT Pub. Date: Dec. 6, 2001

(65) Prior Publication Data

US 2003/0006654 A1 Jan. 9, 2003

(30) Foreign Application Priority Data

May 29, 2000 (FR) .............................. 00 06853

(51) Int. Cl.$^7$ ............................ H02K 3/34; H02K 3/30; H02K 3/40
(52) U.S. Cl. .......................... 310/43; 310/45; 310/215; 174/120 R; 29/596
(58) Field of Search .......................... 310/43, 45, 215; 174/120 R

(56) References Cited

U.S. PATENT DOCUMENTS

| | | | | |
|---|---|---|---|---|
| 2,457,740 A | * | 12/1948 | Sigmund et al. | 310/215 |
| 2,819,514 A | * | 1/1958 | Polard | 29/606 |
| 2,851,515 A | * | 9/1958 | Kolmorgen et al. | 174/117 R |
| 3,062,912 A | * | 11/1962 | Kelk | 174/120 R |
| 3,168,417 A | * | 2/1965 | Smith et al. | 174/120 R |
| 3,571,490 A | * | 3/1971 | Bunish et al. | 174/120 R |
| 3,735,169 A | * | 5/1973 | Balke et al. | 310/214 |
| 3,902,087 A | * | 8/1975 | Hakamada et al. | 310/211 |
| 3,974,314 A | * | 8/1976 | Fuchs | 428/212 |
| 3,980,808 A | * | 9/1976 | Kikuchi et al. | 174/110 SR |
| 3,990,029 A | * | 11/1976 | Kano et al. | 335/297 |
| 4,160,926 A | * | 7/1979 | Cope et al. | 310/215 |
| 4,388,371 A | * | 6/1983 | Bolon et al. | 428/383 |
| 4,514,466 A | * | 4/1985 | Leon et al. | 174/121 A |
| 5,091,028 A | * | 2/1992 | Yamazaki et al. | 156/172 |
| 5,173,960 A | * | 12/1992 | Dickinson | 174/121 A |
| 5,691,058 A | * | 11/1997 | Miyao et al. | 428/379 |
| 6,137,201 A | * | 10/2000 | Umeda et al. | 310/179 |
| 6,137,202 A | | 10/2000 | Holmes et al. | |
| 6,202,285 B1 | * | 3/2001 | Bell | 29/596 |
| 6,459,186 B1 | * | 10/2002 | Umeda et al. | 310/208 |

FOREIGN PATENT DOCUMENTS

| | | | | |
|---|---|---|---|---|
| DE | 29 03 380 A | | 8/1980 | |
| DE | 3842563 A1 | | 6/1990 | |
| JP | 01189906 A | * | 7/1989 | ............ H02K/3/32 |
| JP | 03 270657 | | 12/1991 | |
| JP | 05184091 A | * | 7/1993 | ............ H02K/3/30 |
| JP | 06217484 A | * | 8/1994 | ............ H02K/3/40 |
| JP | 10225036 A | * | 8/1998 | ............ H02K/3/32 |

* cited by examiner

Primary Examiner—Nicholas Ponomarenko
Assistant Examiner—J. Aguirrechea
(74) Attorney, Agent, or Firm—Liniak, Berenato & White

(57) ABSTRACT

The invention proposes a rotary electrical machine of the type which comprises at least one member (14) on which is formed at least one electrical winding (32) consisting of at least one electrically conductive element (34), which is wound to form the winding and which is coated with at least one layer (36) of electrically insulating material, characterised in that the coated conductive element (34) is clad with a connecting layer (72) which consists of at least one first connecting material (73) that joins together adjacent portions of the coated electrically conductive element (34).

The invention also proposes a method of making a member (14) for a rotary electrical machine, characterised in that a coated conductive element (34) is clad with a connecting layer (72) that consists of at least one first connecting material (73), which is heated and solidifies in such a way as to join together the adjacent portions of the conductive element (34).

11 Claims, 5 Drawing Sheets

ROTARY ELECTRIC MACHINE AND METHOD FOR MAKING WINDINGS

This invention relates to a rotary electrical machine of the type which comprises a rotor and a stator on which electrical windings are formed.

The invention also proposes a method of making a rotor and a stator for a rotary electrical machine.

As is known, rotary electrical machines comprise a rotor and a stator on each of which an electrical winding may be formed.

The rotary electrical machine may be an alternator which converts rotary motion of the rotor into an electric current. The electrical machine may also be a motor which converts an electric current flowing through a winding of the rotor into rotational movement of the is rotor. The machine can be reversible and can thereby convert mechanical energy into electrical energy and vice versa.

Each electrical winding consists of a winding of at least one electrically conductive element which is coated with a layer of electrically insulating material. In transverse cross section, a winding is thereby formed in which portions of the electrically conductive element are juxtaposed horizontally and vertically.

As is known, the stator of a rotary electrical machine comprises a body which is provided with a set of axial or helical internal slots open radially and open axially. Such slots can be seen for example in the document FR-A-2 603 429 (U.S. Pat. No. 4,908,541). Conventionally, the body is of metal and consists of a stack of metal laminations. Each slot receives a set of portions of one or more conductive elements of a coil of a stator winding. The coil includes axial strands which are received in the slots and which are joined together by transverse strands in the form of loops which constitute heads of the winding, which are also called wings.

In general, the alternator is of the three-phase type, and the stator has three windings. In another version the alternator is of the six-phase type.

During manufacture of the stator, the axial strands of the coated conductive elements are compressed transversely within the slots, so that they fill the latter more fully, and they are then held in position by means of a slot closure element, for example.

In order to ensure optimum functioning of the rotary electrical machine, it is preferable that the winding should, with the stator, form a sufficiently rigid block, in particular to limit vibrations and noise, and to do so throughout the whole working life of the rotary electrical machine. The block must however be flexible enough to limit magnetic noise.

The known manufacturing method consists in impregnating the winding thus formed with a varnish, so as to stiffen it and to join it to the stator.

The impregnation can be obtained by immersing the stator in a bath of varnish, or by causing varnish to flow over and between the axial and transverse strands.

In order to cause the varnish to set, the stator which is equipped with the winding is heated in a stove to a sufficiently high temperature.

However, the viscosity of the varnish, and the contact between certain portions of the strands of the winding, do not permit the varnish to fill in an optimum manner some of the interstice that exist.

Such a method has a number of drawbacks.

The partial impregnation of the winding does not allow the conductive elements to form a rigid enough block. The mechanical and vibrational strength of the stator is not optimised. In consequence, the noise emitted by the machine is not minimal.

The said method is long, as the impregnation of the winding and setting of the varnish lasts for several tens of minutes. In addition, the method is difficult to control and calls for expensive installations such as stoves which consume large quantities of energy. It also causes polluting vapour to be emitted, especially during heating of the varnish.

The dimensional tolerances in the stator, especially in the wings, are large. In this connection, the positioning of the transverse strands of the electrically conductive element is not correctly controlled. They can shift between the instant at which the axial strands are received in the slots in the stator body, and the instant at which the varnish becomes set. It is therefore necessary to provide large operating clearances around the wings of the stator, so that, firstly, the transverse strands will not rub on the carcass of the rotary electrical machine, which would cause wear in the insulating layer and then a short circuit, and secondly, any risk of fracture of the transverse strands by the rotor during its rotation is avoided.

The movement of the transverse strands also causes the density of the wings to be reduced.

In order to reduce the risk of short circuit between the conductive element and the stator body, a leaf of electrically insulated material is interposed between each wall that defines a slot and the adjacent axial strands of the conductive element that lie in that slot.

The reduction in the risk of short circuiting between the conductive element and the stator body can also be obtained by means of a protective layer such as an epoxy layer. This protective layer is interposed between each wall that defines a slot and adjacent axial strands of the conductive elements situated in that slot.

In order to ensure good mechanical and vibrational strength in the winding, it is preferable that it be immobilised with respect to the stator body, that is to say the leaf of insulating material should be joined to the wall which defines the slot and to the axial strands with which it is in contact. Thus, in general, holes are formed in the leaf in such a way as to enable varnish to pass through them so as to infiltrate between the wall defining the slot and the insulating leaf.

Heating of the stator hardens the varnish, and consequently immobilises the insulating leaf with respect to the axial strands with which it is in contact, and with respect to the slot.

However, it frequently happens that the amount of varnish which enables these joints to be made, especially that which infiltrates between the wall defining the slot and the insulating leaf, is insufficient to ensure fastening of those elements. The vibrations set up by their movement with respect to the stator body increases noise in the rotary electrical machine and reduces its output.

Where the quantity of varnish is insufficient between the wall defining the slot, the leaf of insulating material and the conductive element, heat transfer is reduced, which causes the output of the rotary electrical machine to be reduced.

On the other hand, where there is too much varnish, the general stiffness of the wires with the stator body is not optimum, and this results in magnetic noise induced by the magnetic forces.

In addition, the stiffness of the varnishes currently employed varies with temperature. Thus, the higher the temperature of the varnish, the weaker is the magnetic noise emitted by the rotary electrical machine.

In consequence, the known method does not permit manufacture of a stator which ensures optimum operation of the rotary electrical machine.

The winding of the rotor of the rotary electrical machine is generally formed in a winding body of electrically insulated plastics material, which consists of an annular element having a U-shaped axial half section as can be seen for example in FIG. 1 of the document FR-A-2 603 429 mentioned above.

The winding body guides the electrical conductive element while it is being wound. However, it frequently happens that the transverse wings of the winding body move slightly apart, thereby causing poor winding. The electrically conductive element can take the form of transverse wings overlaid with petals. During transport before impregnation of varnish, there can also occur partial radial displacement of certain portions of the electrically conductive element of the winding which moves the flanks of the winding body apart and causes it to become wider. Thus, when the winding is to be interposed between the two pole wheels, this widening effect is compacted, which involves the danger of destruction of the electrically insulating coating, in particular that of the axial strands of the conductor, thereby creating contacts between them which cause a loss of resistance. In addition, the radial widening effect can be detrimental to the contact between the core on which the winding is mounted and the two pole wheels, which creates a parasitic air gap of the core with respect to the pole wheels and consequently a loss of power and output of the rotary electrical machine.

Varnish is then deposited on the winding, and is then hardened, thereby permanently perpetuating the faults in the winding.

In addition, the winding body, which is generally of plastics material, forms a thermal screen between the winding, the core, and the pole wheels, which is detrimental to transfer and dissipation of the heat produced by passage of the current in the electrically conductive element, and it thereby reduces the output of the rotary electrical machine.

In particular, the varnish enables the mechanical strength of adjacent portions of the electrically conductive element to be achieved between them, and fastens the winding body on the core and pole wheels.

With a view to providing a remedy for these disadvantages, the invention proposes a rotary electrical machine of the type which comprises at least one member on which at least one electrical winding is formed, the winding comprising at least one electrically conductive element which is wound in such a way as to form the winding and which is coated with at least one layer of electrically insulating material, characterised in that, prior to the winding step, the coated conductive element is clad with a connecting layer consisting of at least one connecting material that joins together adjacent portions of the coated electrically conductive element, in that an electrically insulating leaf is interposed between the winding and the member on which the winding is formed, and in that the insulating leaf comprises an electrically insulating structural element, on at least one of the faces of which a second connecting material is applied at least partially, whereby to join the insulating leaf to the winding and/or the member on which the winding is formed.

Thanks to the invention, optimum filling is obtained in the interstices that exist between the strands of the winding and electrical insulation between the winding and the member on which the winding is mounted.

The second connecting material reinforces the filling of the said interstices and/or the joint with the said member, so that the performance of the machine is improved.

Preferably, the structural element is at least partially impregnated, that is to say coated on its two faces, by the second connecting material, to give maximum optimisation such that good mechanical and vibrational strength of the winding are obtained. The winding is thus immobilised with respect to its associated member, while forming a block which is robust without any relative movement between its strands in the electrically conductive elements and the said associated member.

In addition, the insulating leaf is perfectly immobilised and can be very thin, and no hole need be provided in the latter, so that the material in the electrically conductive element, and the performance of the machine, can be increased.

Preferably, the insulating leaf is thin and is thermally conducting, so as to evacuate heat effectively to the appropriate member which is a thermal conductor, thereby optimising the performance of the machine even more.

The said connecting material is chemically and thermally compatible with the first connecting material.

According to further features of the invention:

the second connecting material is identical to the first connecting material, for the most intimate possible cooperation between these latter and improved temperature control; the connecting elements react in the same way;

the structural element is a leaf of electrically insulating paper;

the structural element is made of electrically insulating cloth;

at least one of the connecting materials comprises a polymer;

the polymer is of the thermosetting type, for greater reliability and longer useful life of the electrical machine;

the polymer is of the thermoplastic type, the melting point of which is higher than the maximum working temperature of the rotary electrical machine;

the member on which at least one winding is formed is a stator;

the member on which at least one winding is formed is a rotor;

the machine is an alternator;

the machine is an electric motor.

The invention also proposes a method of making a member for a rotary electrical machine on which there is formed at least one electrical winding comprising at least one electrical conductive element which is wound in such a way as to form the winding, and which is coated with at least one layer of electrically insulating material, of the type which includes a step of winding the conductive element in such a way as to form the electrical winding, characterised in that prior to the winding step, the coated conductive element is clad with a connecting layer consisting of at least one connecting material that joins together two adjacent portions of the coated electrically conductive element, in that the winding step is followed by a step of changing the state of the connecting material so as to cause it to soften or melt whereby it fills, at least partially, the interstices that exist between the adjacent portions of the conductive element, and so as then to cause it to solidify once again, whereby to join together the adjacent portions of the conductive element, in that an electrically insulating leaf which comprises a structural element at least partially coated or impregnated with a second connecting material, is interposed between the winding and the member on which the winding is formed, and in that, during the step of changing state, the second connecting material is softened or melted and is then once again solidified, and joins together the insulating leaf and adjacent portions of the conductive element and/or the member on which the winding is formed.

According to further features of the method of making a member of a rotary electrical machine:

- at least one of the first or second connecting materials comprises a polymer, and the step of changing state causes its polymerisation to take place;
- in association with the step of changing state, the winding is formed into a predetermined shape by means of a shaping tool, which exerts a force on at least one zone of the winding in such a way as to deform it;
- the winding is given its predetermined shape by means of a shaping tool which exerts at least a radial force on at least one axial annular zone of the winding, so as to deform it and to determine at least one diameter of the winding;
- the winding is put into its predetermined shape by means of a shaping tool which exerts an axial force on at least one radial annular zone of the winding, so as to deform it and to determine the axial dimension of the winding;
- the winding is given its predetermined shape by means of a shaping tool which exerts a force on a peripheral annular face of the winding in such a way as to give it a convex form;
- the winding is put into its predetermined shape by means of a shaping tool which deforms the winding in such a way as to form at least one notch on a peripheral face, in particular a recess formed on an external annular peripheral face to permit passage of at least one axial tooth of a pole wheel, where the member is a rotor and the rotary electrical machine is an alternator;
- the step of changing state comprises a step of heating the connecting layer to a hardening temperature higher than or equal to the melting point of the first connecting material, whereby to cause it to melt so that it fills at least partially the interstices that exist between the adjacent portions of the conductive element, and a cooling step in the course of which the first connecting material solidifies once again and joins together the adjacent portions of the conductive element;
- during the heating step, the second connecting material which coats or impregnates the structural element of the leaf is brought to a temperature higher than its melting point, and, during the cooling step, the second connecting material solidifies once again and joins together the insulating leaf and adjacent portions of the conductive element and/or the member on which the winding is formed;
- in association with the cooling step, the winding is formed into a predetermined shape by means of a shaping tool which exerts a force on at least one zone of the winding in such a way as to deform it;
- the heating step consists in heating the electrically conductive element at least partially, by Joule effect, in such a way as to bring the temperature of at least one of the connecting materials to a temperature higher than or equal to its hardening temperature;
- the heating step consists in heating the electrically conductive element at least partially by induction, by placing the winding in a magnetic field whereby to bring the temperature of at least one of the connecting materials to a temperature higher than or equal to its hardening temperature;
- the heating step consists in heating at least one of the connecting materials at least partially by stoving, whereby to bring the temperature of at least one of the connecting materials to a temperature higher than or equal to its hardening temperature;
- the step of changing state consists in projecting a reactive substance such as alcohol on at least one of the connecting materials, whereby it causes it to soften or melt and then once again causes it to solidify.

According to a further feature, the heating step is preceded by a step of preheating the appropriate member so as to reduce the temperature gradients that appear during the heating operation.

In all cases, the temperature attained during the preheating phase in the region of the appropriate winding will be able to be lower than or equal to the hardening temperature of the connecting element.

Because of the step of preheating, the electrically insulating leaf may be made very thin while being thermally conductive, which further minimises the size of the rotor and/or enlarges the winding, as well as optimising still further the transfer of heat to the relevant member while assuring optimum connection of the adjacent portions of the electrically conductive element.

In all cases of course, the electrically insulating layer is so (chosen that it will not be destroyed during the heating and/or preheating step. The same is true for the electrically insulating leaf.

Further features and advantages of the invention will appear on a reading of the following detailed description, for an understanding of which reference will be made to the attached drawings, in which.

Figure 1:
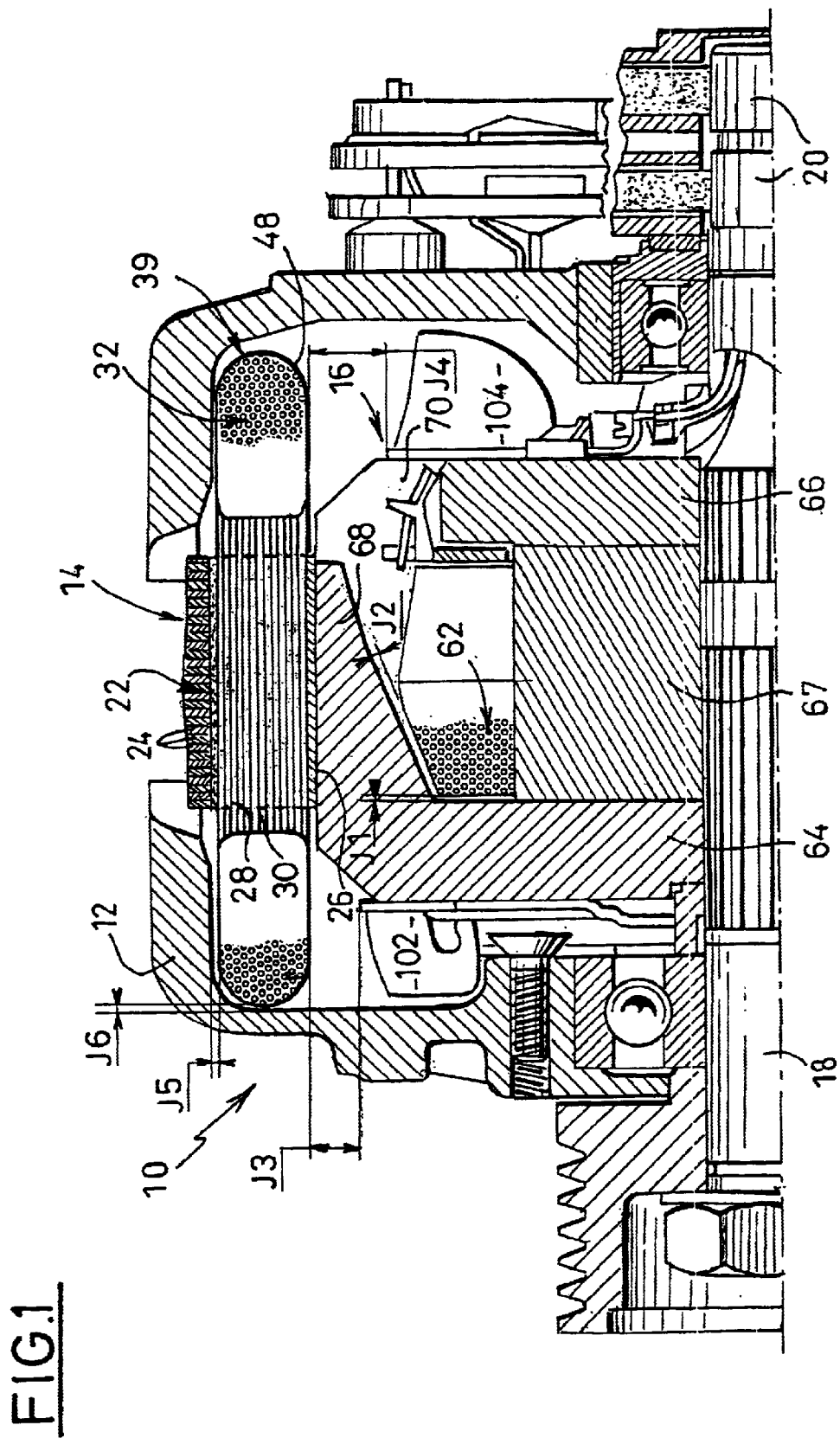
FIG. 1 is an axial view in half section of an alternator made in accordance with the invention.

In the remainder of the description, and with a view to affording easier understanding of the description, an orientation from front to rear will be used, corresponding to the orientation from right to left in FIG. 1.

FIG. 1 shows an alternator 10 which consists mainly of a casing 12 in two parts, carrying two main internal members which consist of a stator 14 and a rotor 16, as described for example in the document (U.S. Pat. No. 527,605 (EP-B-0 515 259), to which reference should be made for more detail.

The stator 14 surrounds the rotor 16, which is fixed to a shaft, on the rear end of which two slip rings 20 are fixed, while a pulley (not given a reference numeral) is fixed to the front end of the shaft 18. This pulley is adapted to receive a belt which is part of a motion transmission device driven by the internal combustion engine of the motor vehicle.

The stator 14 consists of a body 22 which in this example consists mainly of an axial stack of transverse soft iron laminations 24.

An internal annular face 26 of the body 24 has axial slots 28, one of which, but only one, is shown in part in FIG. 1, and which extend radially outwards to receive axial strands 30 of an electrical winding 32. The notches are open inwards as can be seen for example in the document FR-A-2 603 429.

The electrical winding 32 consists for example of a coil-wound electrical conductive element, which in this example is a copper wire, and which is coated with at least one layer of electrically insulating material, for example a polyester in two layers, one of which is of the polyimide type, the other being of the polyamide imide type.

Figure 2:
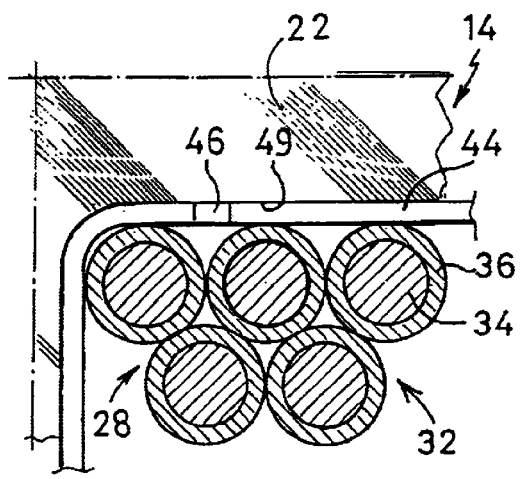
FIG. 2 is a scrap view in transverse cross section and on a larger scale, showing a winding consisting of a conductive element coated with a layer of electrically insulating material in a stator according to the state of the art.

FIG. 2 shows on a larger scale, in transverse cross section, part of a winding of the conductive element 34 coated with a layer 36 of electrically insulating material, before the impregnation of varnish in accordance with a method found in the state of the art.

Figure 3:
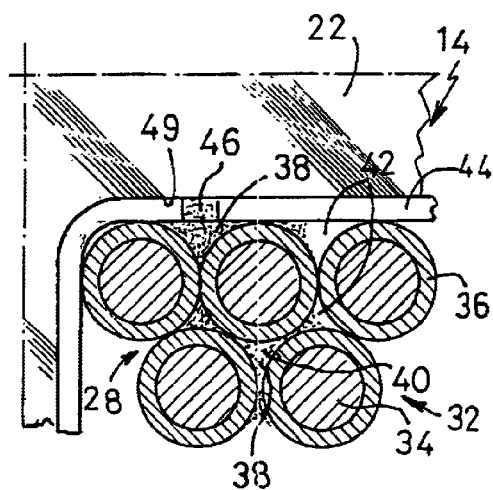
FIG. 3 is a view similar to that shown in FIG. 2, but with the electrical winding having been impregnated with varnish in accordance with the state of the art.

FIG. 3 is a view similar to that shown in FIG. 2, with the electrical winding 32 having been impregnated with varnish 32 and heated so as to harden it. This Figure shows the unequal filling achieved by the varnish 38 in the interstices 40 and 42 which exist between adjacent portions of the axial ends 30. Thus, certain interstices 40 are correctly filled, thereby ensuring good fastening of the adjacent portions of the axial strands 30, while other interstices 42 show partial or total absence of varnish 38, the adjacent portions situated around these interstices 42 being incorrectly fixed together. Thus, in operation of the alternator 10, these elements will vibrate and will cause, firstly, an increase in the sound level in operation of the alternator 10, and secondly, wear in the layers 36 of electrical insulating material which increases the risk of short circuit. The non-homogenous filling of the interstices thus reduces heat exchange and consequently the output of the alternator 10.

An electrically insulating leaf 44 is interposed between the electrical winding 32 and the body 22 of the stator 14. It reduces or eliminates the dangers of short circuit between the winding 32 and the body 22.

In order to reduce the sound level of the alternator 10, it is necessary to immobilise the insulating leaf 42 with respect to the electrical winding 32 and the body 22. To this end it is known in the state of the art to form holes 46 which extend through the leaf 44, so as to enable the varnish 38 to pass through it and thereby to penetrate between the insulating leaf 44 and the wall 49 of the axial slot 28 facing the latter.

However, the holes 46 are not sufficient to ensure correct fastening of the insulating leaf 44 with respect to the axial slot 28.

The axial strands 30 are extended by connecting strands 48 which are formed into wings 39, which project on either side of the body 22 of the stator 4 as shown in FIG. 1.

In another version, hairpin clips of circular or rectangular cross section are used, being mounted in the axial slots 28 of the stator 14 in the manner described in the document WO-92/06527. In a further version, four electrically conductive elements are radially superimposed on each other in each slot.

In this example the rotor 16 is a claw-type rotor having a cylindrical electrical winding 62 which is mounted between two metallic plates 64 and 66, each of which includes claws 68 and 70 respectively that extend axially towards the other plate 66 and 64. Each assembly of plate and claws constitutes a pole wheel, which in this example is of magnetic steel. In accordance with one feature, a core 67, which in this example is also of magnetic steel, is interposed axially between the plates 66, 64. The core 67 is of axially oriented annular form, and in this case has the form of a thick ring. The core 67 in this example is separate from the pole wheels, so as to facilitate winding of the electrically conductive element on the core without the claws 68, 70 interfering. Each pole wheel is fixed on the shaft by means of milled portions of the shaft, one of which serves to fasten the core 67. The claws 68 and 70 are offset angularly with respect to each other so that a claw 68 of the plate 64 is interposed between two adjacent claws 70 of the plate 66, and vice versa. For more detail, reference should be made to the document EP-0 515 259, which also shows further components of the alternator. The alternator is accordingly, here, one with internal ventilation, with each plate 64, 66 carrying a fan 102, 104 respectively adjacent to the appropriate portion of the casing. Each part of the casing 12 is perforated to allow air to circulate, and carries a central ball bearing for supporting, respectively, the front and rear ends of the shaft 18. Thus, one of these parts is called the front bearing (i.e. the one adjacent to the pulley), the other one being the rear bearing. The rear bearing carries a device for rectifying the current produced by the stator, and a brush holder which co-operates with the slip rings 22. There is also provided a protective cover (not shown), which shrouds the brush carrier and is connected in the known way to a regulating device, and the rectifier device which comprises diodes. The front and rear bearings are of metal, and are of hollow form delimited by a transverse plate carrying the appropriate ball bearing, and by an axially oriented peripheral flange which is shouldered internally to carry the stack of laminations 24 of the stator. The transverse plates and flanges, in the known way, are formed with apertures for air flow. Thus, the flanges have apertures facing the axial ends 39 of the winding 32, called the wing, which projects axially with respect to the body 22 of the stator 14, while the radial plates have apertures facing the blades of the fans 102, 104. The said bearings are secured together by means of screws or stretchers, as can be seen for example in FIG. 1 of the document EP-B-0 515 259 mentioned above. In another version a single fan is fitted on the outside in the region of the pulley.

Figure 4:
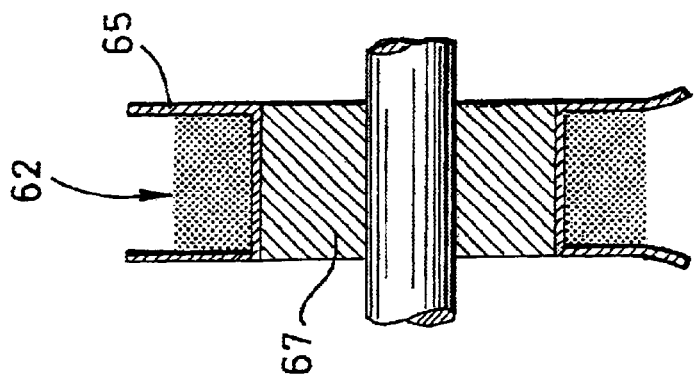
FIG. 4 is a view in transverse cross section of a rotor in the state of the art.

In the state of the art, the electrical winding 62 is formed in a winding body 65 (shown in FIG. 4) of plastics material, which guides the coated conductive element 34, in this example also of copper, and which is secured, for example by force-fitting, directly on a hub 67 of magnetic steel shown in FIG. 4.

The bottom half view shown in FIG. 4 illustrates the axial widening of the winding body 65 due to the partial radial collapsing of certain portions of the electrically conductive element.

The electrical winding 62 of the rotor 16 is made in accordance with the state of the art, and it has the disadvantages described above.

The invention proposes, for the windings 32 and 62 of the stator 14 and rotor 16 respectively, to make use of the conductive elements 34 which are coated in advance with a layer 36 of electrically insulating material, and which are clad with a connecting or fastening layer 72, which consists of at least one connecting material 73 that joins together the adjacent portions of the coated electrically conductive element 34.

Figure 5:
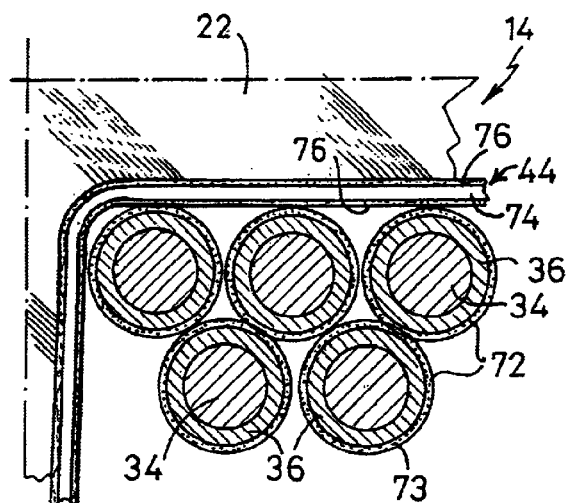
FIG. 5 is a view similar to that shown in FIG. 2, but with the coated conductive element being clad with a connecting layer according to the invention.

FIG. 5 is a scrap view in transverse cross section of an electrical winding 32 of a stator 14 according to the invention.

According to a further feature, the insulating leaf 44 includes an electrically insulating structural element 74, which is made for example of paper or insulating cloth, and in which at least one of its faces is at least partially coated with a connecting material 76. For example, only the face that faces towards the turns of the winding 74 is, at least partially, coated with a connecting material 76. Preferably, both faces of the structural element are given a connecting material 76 which is chemically compatible with the first connecting material.

The connecting material 73 of the connecting layer 72 with which the layer 36 of the conductive elements 34 is clad is, in one embodiment, identical to the connecting material 76 on the insulating leaf 44.

In another version, the connecting materials 73 and 76 are compatible chemically and thermally so as to optimise their specific function. The material 76 is accordingly chosen to give a good connecting function with the body 22, while the connecting material 73 is so chosen as to give good and improved filling by virtue of the presence of the connecting element 76.

The structural element 74 may also be impregnated by the connecting material 76. Thus, where the structural element 74 is made of cloth or an analogous non-textile element, the connecting material 76 covers its faces and penetrates at least partially between the fibres which constitute the structural element 74.

The connecting materials may for example consist of a polymer.

The polymer may be of the thermosetting type which retains its mechanical characteristics after being polymerised, at least up to the maximum working temperature of the alternator 10, or it may be of the thermoplastic type having a melting point higher than the maximum working temperature of the alternator 10.

Given that the connecting material 73 shrouds the coated conductive elements 34 of the layer 36 of electrically insulating material, the step of impregnating the electrical windings 32 and 62 in the procedure for making the stator 14 and rotor 16 of the alternator 10 in the state of the art is eliminated, which enables the manufacturing time for the alternator to be reduced by several minutes, or even several tens of minutes.

The use of varnish gives rise to emissions of polluting vapour, especially while it is being heated. The use of different connecting materials 73, 76 on the coated conductive element 34 enables the use of varnish to be eliminated, and polluting emissions into the atmosphere to be reduced or even eliminated.

In the remainder of the description it will be assumed that the connecting material 73 of the layer 72, and the connecting material 76, are identical to each other.

The method of making the alternator 10 according to the invention accordingly proposes that the step of winding the coated and clad conductive element 34 shall be followed with a step of changing the state of the connecting material, which causes it to be softened or melted so that it will fill at least partially the interstices that exist between the adjacent portions of the conductive element 34, and which then causes it to solidify again so as to join together the adjacent portions of the conductive element 34.

The step of changing state corresponds to modification of the structure of the connecting material, that is to say a movement of some of its constituent atoms with respect to the others.

In a first embodiment of the invention, the step of changing state of the material comprises a step of heating the connecting layer 72 to a softening temperature which is higher than, or equal to, the melting point of the connecting material, in such a way as to cause it to melt or soften so that it flows or runs in such a way as to fill, preferably substantially entirely, the interstices that exist between the adjacent portions of the conductive element.

The heating step is followed by a cooling step, in the course of which the connecting material hardens or solidifies once again.

The hardening or solidifying temperature of the connecting material is the temperature beyond which the structure of the material is modified in such a way that the material joins together the elements with which it is in at least partial contact.

Thus, where the polymer is of the thermosetting type, the reticulation temperature will be referred to in the remainder of the description and also in the Claims as its hardening temperature.

Also, where the polymer is of the thermoplastic type, the melting point will be referred to in the remainder of this description, and in the Claims, as its hardening temperature.

Where the connecting material is a polymer, the steps of heating and cooling enable it to be polymerised and to solidify, which ensures the rigid connection to each other of the adjacent portions of the conductive element 34 which are coated between and with the insulating leaf 44, which is preferably a conductor of heat.

Where the insulating leaf 44 is given a connecting material 76 such as a polymer, the steps of heating to a temperature greater than or equal to the hardening temperature of the connecting material 76 and the cooling step, have the effect of joining it to the body 24 of the stator 14 and of reinforcing its connection with the adjacent portions of the coated conductive element 34.

Since the connecting material is distributed substantially regularly over the layer 36 of electrically insulating material and over and/or in the structural element 74, its melting or softening during the temperature rise leads to filling, preferably homogeneous, of the interstices 40 that exist between the adjacent portions of the coated conductive element 34, and between the adjacent portions of the coated conductive element 34 and the insulating leaf 44. Thus, after the connecting material has been heated to a temperature higher than or equal to the hardening temperature of the connecting material 74 during its cooling and solidification, the adjacent portions of the coated conductive element 34 and the insulating leaf 44 are joined strongly together and form a rigid assembly. Thanks to the invention, the leaf 44 can be made thin.

The insulating leaf 74 and the layer of electrically insulating material are of course so chosen as to be resistant to the heating step.

The connecting material then covers the winding 32, preferably integrally, thereby ensuring its protection against external contaminants such as dust. It also ensures mechanical strength and stiffening of the coated conductive element 34.

The connecting material gives even better thermal conduction.

The face of the insulating leaf 44 which is in contact with the wall 49 of the axial slot 28 may be covered with the connecting material 76. Thus, after the connecting material 76 has been heated to a temperature greater than or equal to its hardening temperature, heating and solidification of the connecting material 76 enables the body 22 of the stator 14 and the insulating leaf 44 to be joined fast together, to form a rigid assembly.

The invention also proposes, in association with the cooling step, to form the electrical windings 32 and/or 62 into a predetermined shape by means of a shaping tool 78, which exerts a force on at least one zone of the winding 32, 62, in such a way as to deform it. Thus, when the cooling step has finished, the electrical windings 32 and/or 62 have a predetermined form which is irreversible at the working temperatures of the alternator 10.

Application of the force on at least one zone of the winding 32, 62 can preferably start before or during the heating step, and last until the hardening or solidification of the connecting material 76 takes place.

Thus, at the end of the winding step, the stator 14 is placed in a shaping tool 78 shown in FIG. 5.

The shaping tool 78, which is preferably made of a thermally and electrically insulating material, is symmetrical with respect to a central transverse plane P. In the remainder of this description, only the left hand half of the shaping tool 76 will be described with respect to the central plane P with reference to FIG. 6.

The shaping tool 78 comprises a first, fixed, external peripheral die 80, in which the body 22 of the stator 14 is centred. A second internal die 82 is movable in a radial direction. The first die 80 is in two parts, so as to come into contact with the ends of the body 22 and to immobilise the latter axially.

Figure 7:
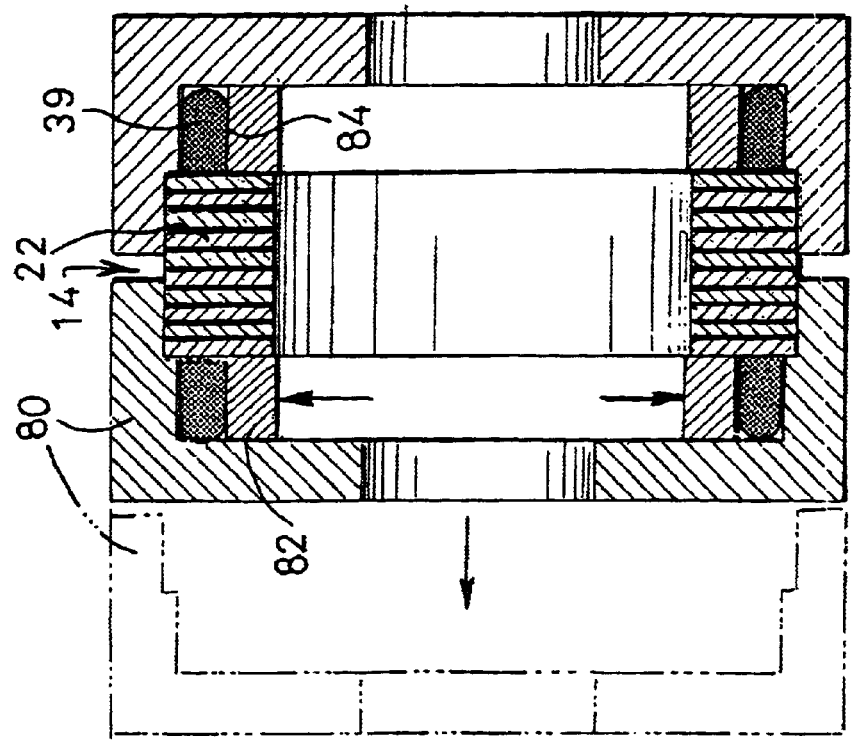
FIG. 7 is a view similar to that shown in FIG. 6, but with the shaping tool having deformed the wings of the stator.

The second die 82 enables a force to be exerted on the annular axial face 84 of the wing 39. It accordingly compresses the portions of the coated and clad electrically conductive element 34 constituting the wing 39, against the internal faces 86 of the first die 80 as shown in FIG. 7. This second die 82 is also in two parts, which are movable radially in opposite directions.

Figure 8:
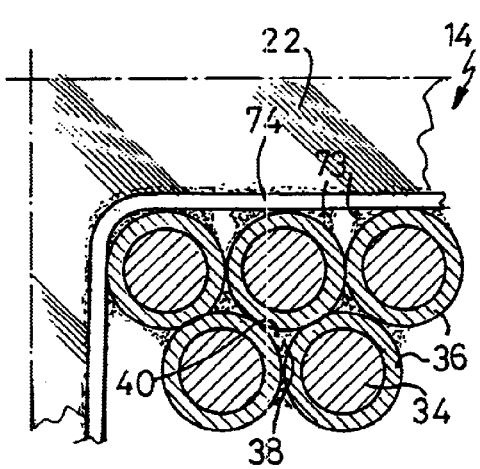
FIG. 8 is a view similar to that shown in FIG. 5, but with the connecting layer having filled the interstices which exist and which join together the portions of the conductive element.

Subsequently, the connecting material is heated to a temperature greater than or equal to its hardening temperature, in such a way as to cause it to melt or soften, and to harden or polymerise, in particular where the material is a polymer. Putting the wings 39 associated with filling of the interstices 40, in particular by the connecting material 73 of the connecting layer 72, under stress, causes the portions of the coated electrically conductive element 34 to be held tight as shown in FIG. 8, and causes the external dimensions of the wings 39 of the stator 14 to be modified.

The form of the wing 39 accordingly corresponds to the optimal form that enables the bulk of the stator 14 in the alternator 10 to be minimised.

During the heating and/or cooling steps, the optimum form of the stator 14 is set in such a way as to be irreversible at the working temperatures of the alternator 10.

Thus the exact dimensions of the stator 14 are precisely determined, and they can be reproduced in quantity production.

The second die 82 then ceases to exert any force on the wing 39, and the shaping tool 76 is then open so that the stator 14 can be extracted from it.

Control of the dimensions of the stator 14 enables the dangers of friction of a portion of the coated electrically conductive element 34 rubbing on the casing 12 of the alternator 10 to be eliminated, and therefore eliminates wear in the layer 36 and the dangers of any short circuit.

Figure 6:
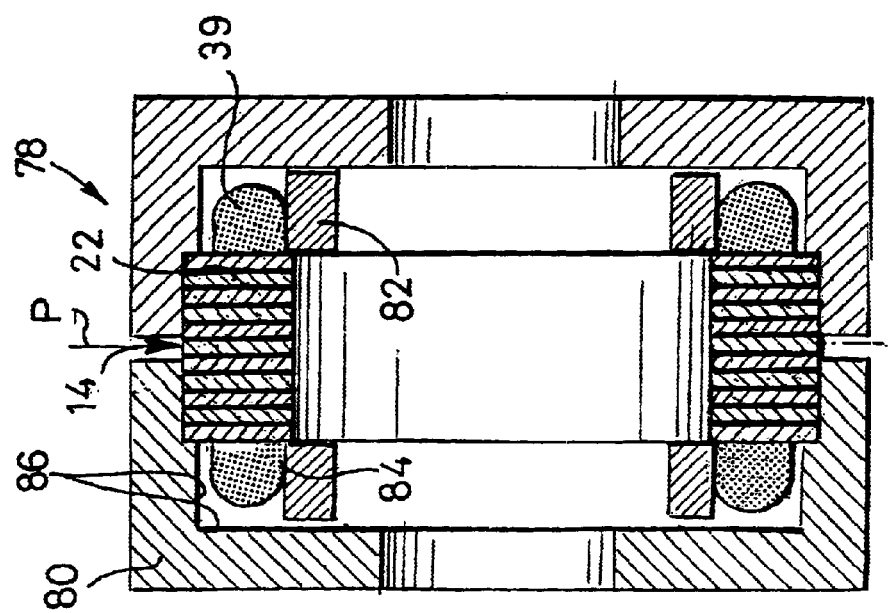
FIG. 6 is a view in longitudinal cross section of a stator placed in a shaping tool.

It will be appreciated that the wings 39 may come very close to the exposed front and rear bearings, respectively, of the casing 12, by virtue of the second dies 82 in FIGS. 6 and 7. This enables the size of the casing 12 to be reduced, and therefore gives a saving in material as well as reducing overall size. All combinations are of course possible, and at least one of the windings of the stator 14 and rotor 16 can be clad with a connecting layer 72. The rotor 16 may, in another version, be a rotor with projecting poles, and may have more than one winding.

Similarly, the external dimensions of the winding 62 of the rotor 16 are determined by a shaping tool 93. This shaping tool 93 accordingly also comprises a two-part first die 95 and a second die 98, which this time is radially on the outside and is in two parts which are movable radially with respect to each other, this time towards the axis of the shaft 18.

The first die 95 immobilises the core 67, the said parts of the die being disposed on either side of the core 67 and in contact with the axial ends of the latter. The first die 95 consists of two transverse plates disposed on either side of the core 67. These plates include a thickened portion on their radial periphery for centring the core 67 and to define the clearance J1 in FIG. 1.

The shaping tool may also give a particular form to the winding 62. The second die 98 accordingly has two parts, each of which has a hollow internal form which in this example is V-shaped, for increasing the size of the winding 62.

Figure 9:
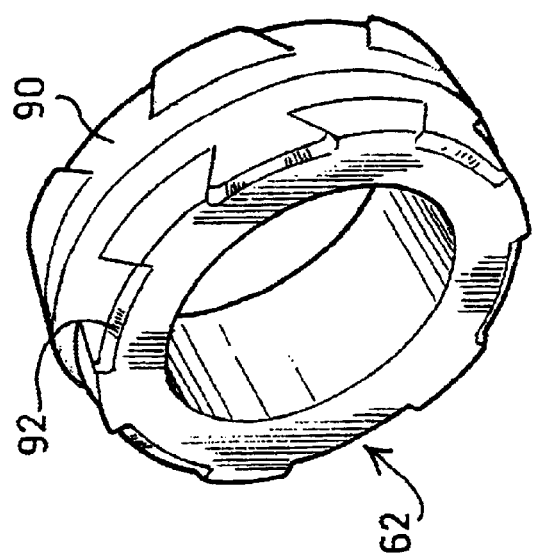
FIG. 9 is a perspective view of a rotor winding according to the invention.

FIG. 9 shows a winding 62 of the rotor 16. Its external annular peripheral face 90 is convex, having in this example a V-shaped profile. In addition, the winding 62 includes notches 92 which are formed during the heating step and/or the cooling step by the shaping tool which is movable radially so as to optimise the overall size of the winding 62. In this connection, the recesses 92 provide space for the claws 68 and 70 of the plates 64 and 66. Thus, the volume of the winding 62 can be increased without the total size of the rotor 16 being modified. The output of the alternator 10 is then increased.

Figure 10:
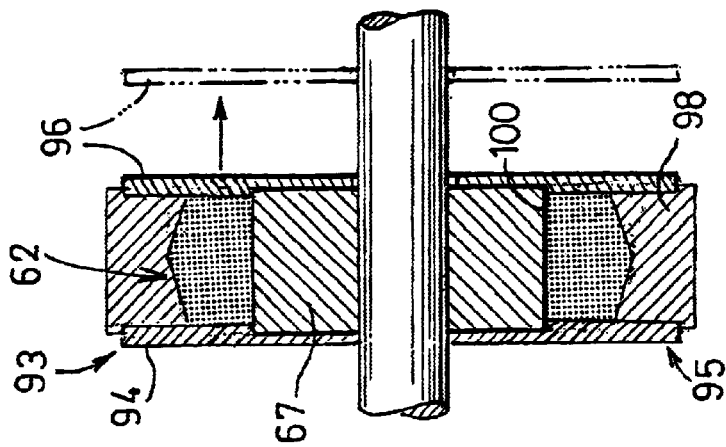
FIG. 10 is a view in longitudinal cross section of a rotor winding according to the invention.

The method according to the invention also enables the winding body 65 to be eliminated and the size of the winding to be increased. In this connection, during the winding step, the coated and shrouded electrically conductive element 34 may be guided transversely by the two transverse plates 94 and 96 that determine the width of the winding 62, as shown in FIG. 10. The two transverse plates 94 and 96 maintain the coated and clad electrically conductive element 34 in position until the end of the cooling step, after the connecting element 76 has been heated to a temperature greater than or equal to its hardening temperature. The second die 98 exerts a radial force on at least one axial annular zone of the winding 62, so as to deform it in order to determine its external form, and in particular its diameter. The transverse plates 94, 96, and the die 98, are then withdrawn axially.

Similarly it is possible to deform at least one of the zones of at least one of the wings 39, in order to determine its external form.

A radial annular zone of the winding 32 may be deformed in such a way as to form a hollow of complementary form to an axial element (not shown) which extends on an internal face of a transverse wall of the casing 12, towards the stator 14. Such a hollow then enables a general reduction to be obtained in the axial dimensions of the alternator 10, and thus reduces its size.

The winding 62 in this example is formed directly on the core 67. The heating and cooling steps cause the connecting material to join the winding 62 and core 67 together.

The winding 62 can also be formed on an intermediate member, from which it is separated after its connecting material has been hardened. It is then assembled with a mounting clamped on the core 67.

Elimination of the winding body 65 firstly enables the number of components of the rotor 16 to be reduced, which reduces its manufacturing cost, but it also increases heat transfer between the winding 62 and the outside, thereby increasing the output of the alternator 10.

The increase in heat transfer also reduces the need to cool the alternator 10, and consequently enables the size of the cooling fins of the front fan 102 and rear fan 104 shown in FIG. 1 to be reduced in size, or even enables at least one of these two fans 102, 104, and in particular the front fan 102, to be eliminated.

Elimination of the winding body 65 also enables either the volume of the rotor 16 to be reduced, while conserving the same power for the alternator 10, or else enables the power of the alternator 10 to be increased by increasing the dimensions of the winding 62 while retaining the same volume for the rotor 16.

The rear wing 39 can be longer than the front wing 39.

In order to reduce or eliminate the dangers of short circuiting between the winding 62 and the core 67, and/or to improve their connection, it is of advantage to interpose between these two elements a leaf of electrically insulating material 100 similar to the insulating leaf 44 of the stator 14. The leaf 100 of electrically insulating material is thinner than the winding body 65, and is preferably clad or impregnated at least partly with a connecting material which may be identical to the connecting material 76. Preferably, the two faces of the leaf 100 are coated with a connecting material in such a way that the connecting material also connects together the winding 62 and core 67. The connecting material of the leaf 100 is therefore preferably of the thermoplastic type, the melting point of which is higher than the maximum working temperature of the machine, or, and preferably, is of the thermosetting type which increases reliability of the machine. As mentioned above, the connecting material is a polymer.

Preferably, the leaves 44, 100 are thermal conductors in order to encourage evacuation of heat towards the body 22 and towards the core 67 respectively. These leaves are of low thickness.

The method according to the invention reduces the volume occupied by the windings 32 and 62, which reduces their volume. In consequence, this reduces the generation of wind noise when the alternator 10 is working.

The stiffness of the connecting material 73, 76 which is used is preferably lower than that of the varnish used in the state of the art. This enables the stiffness of the assembly consisting of at least one of the windings 32, 62 and the elements to which it is joined by the connecting material 73, 76, to be reduced, which, in particular, reduces magnetic noise emitted by the alternator 10 while resisting mechanical stresses, especially vibrational stresses.

In addition, the connecting material 73, 76 which is used is preferably insensitive to variations in temperature over the range of working temperatures of the alternator 10. Thus, the level of magnetic noise emitted by the alternator 10 is substantially constant during operation of the alternator 10.

The method according to the invention also enables variations in the dimensions of the windings 32 and 62 of the stator 14 and rotor 16 to be reduced. It is thus possible to reduce the operating clearances J1 and J2 between the winding 62 and the plates 64, 70 and claws 68, 70 respectively, and the clearances J3 and J4 between the stator 14 and the fans 102, 104 respectively, which reduces even further the size of the alternator 10. In practice, the clearance J1 is preferably smaller than the thickness of the winding body 65. The invention optimises the clearances.

The method also enables the working clearances J5 and J6, which exist radially and axially respectively between the wings 39 of the stator 14 and casing 12, to be reduced.

Hardening of the connecting material is obtained by the heating step, which may consist in heating the connecting material by stoving, so as to bring its temperature to a value higher than, or equal to, its hardening temperature.

In another version, the heating step consists in heating the coated and clad electrically conductive element 34 by Joule effect in such a way as to bring the temperature of the connecting material to a temperature greater than or equal to its hardening temperature. The temperature must be high enough, and the heating must last sufficiently long, so that, in addition, the connecting material 76 with which the insulating leaf 44, 100 is clad will itself reach its hardening temperature. This is achieved for example by causing the current to flow at an intensity sufficiently high in the electrical conductor of the winding 32 and/or 62 to cause heating to take place. The temperature of the conductive element must of course, in all cases, remain lower than a maximum temperature so as not to damage the layer of electrically insulating material 36.

This solution has several advantages.

It calls for simple means which consist of an electrical supply across the electrically conductive element 34 which provides an intensity high enough to heat the connecting material to a temperature greater than or equal to its hardening temperature, thereby greatly limiting the investment needed.

It enables the electrically conductive element 34, the layer 36 of electrically insulating material, and the connecting layer 72, to be heated alone, which reduces the energy consumed and limits heating of elements such as the body 22 of the stator 14 and the hub 67 of the rotor 16. The rise in temperature of the electrically conductive element 34, and consequently that in the connecting material 73, is very rapid, being of the order of a few seconds.

Heating of the connecting material 76 of the insulating leaf 44 may be 35 obtained using the energy released by the electrically conductive element 34.

Thus, the steps of impregnation and heating, which last three or four hours in the state of the art, are reduced to a single heating step which lasts about 10 seconds.

In other versions, hardening of the connecting material may be obtained by heating the coated and shrouded conductive element 34 by an induction method, in which the winding 32, 62 is placed in a magnetic field.

In a second embodiment of the invention, the step of changing state consists in projecting a reactive substance over at least one part of one of the connecting materials. The reactive substance then causes the softening or melting of the connecting material to take place and then causes it to solidify again.

Where the connecting material is a polymer of the thermoplastic type, the reactive substance is preferably alcohol.

The joint between the insulating leaf 44 and adjacent portions of the conductive element 34 and/or the member 14, 16 on which the winding 32, 62 is formed has the same advantages as those described above for the first embodiment.

In a manner similar to the first embodiment, it is of advantage to form at least one of the windings 32, 62 into a predetermined form by means of a shaping tool 78, 93 which exerts a force on at least one zone of the winding, in such a way as to deform it simultaneously with the step of changing the state.

The foregoing description describes an alternator 10 and the method of making its stator 14 and rotor 16. However, the invention bears in a similar way on a rotary electrical machine of another type such as an electric motor, and on the method of making its components comprising a winding.

Since the invention confers on the winding resistance to heat as well as improved evacuation of heat, especially through a better control of the clearances and elimination of the winding body, one of the fans carried by the rotor can be omitted. For example the front fan in FIG. 1 can be omitted. The rear wing 39 may be longer than the front wing 39.

Thus, it will be clear from the description and the drawings that the performance of the electrical windings 32 and/or 62 is improved due to the fact that they can make better use of the available space, especially as regards the winding 62 which can be brought very close indeed to the inner periphery of the axial claws 68, 70 and to the radial faces, in facing relationship therewith, of the pole wheels 64, 66 of the rotor 16.

It is possible to form a sub-assembly which can be handled and transported and which comprises the winding 62 and core 67.

In another version of course, the winding 62 may be barrel-shaped at its outer periphery.

As described above, the electrically conductive element is, during one step, spiral-wound in such a way as to form the electrical winding 32, 62. This step is followed by a step in which the connecting material undergoes a change of state, this step itself comprising a step in which the conductive element is heated, in particular by Joule effect so as to cause the connecting material to be softened or melted whereby to fill at least partly, and preferably completely, the interstices that exist between the adjacent portions of the conductive elements, this being followed by a cooling step which once again causes the connecting material to be solidified or hardened so as to bond together the adjacent portions of the conductive element with which it is in contact.

The heating step accordingly consists in heating the electrically conductive element, for example by Joule effect, so as to bring the temperature of the connecting material to a temperature higher than or equal to its hardening temperature. Thus, where the connecting material is a polymer of the thermosetting type, its hardening temperature is its reticulation temperature, while, where the connecting material is a polymer of the thermoplastic type, its hardening temperature is its melting point.

In accordance with one feature, in one embodiment the step of changing state is preceded by a step in which the body 22 of the stator 14 and/or the core 67 is heated in such a ways to limit temperature gradients within the winding. In this connection, the body 22 and core 67 are of metal, and are relatively thick, so that in the vicinity of the body and the core, the temperature of the connecting element can be lower. The preheating step makes the temperature more homogeneous.

For example, the preheating step is carried out by induction, or else it is obtained by infrared radiation or heating of the turns of the winding by Joule effect (current flow) at a temperature lower than the hardening temperature of the connecting material.

In the embodiments of FIGS. 11 to 14, the core 67, which is in the form of a thick ring, is preheated. This preheating is carried out for example at a temperature of at least 80°, and in this example is of the order of 100°, up to an upper limit which is equal to the hardening temperature of the connecting material. In the course of this step, the temperature of the winding 62 develops in a similar way to that of the core 67. In these Figures, the leaf 100, which in this case is very thin, is shown. This leaf is coated as described above with a connecting material which in this case is identical to the connecting material of the electrically conductive element 118, which is for example of copper, this accordingly being also the connecting material of the turns of the winding 62. The hardening temperature of the connecting material in this example is of the order of 200°. The leaf 100 is of thermally conductive material. Joule effect heating, obtained by current flow in the winding 62, lasts in this case for about 30 seconds, which enables the external turns of the winding 62 to be brought to a temperature of 240°, which is higher than the hardening temperature.

Figure 11:
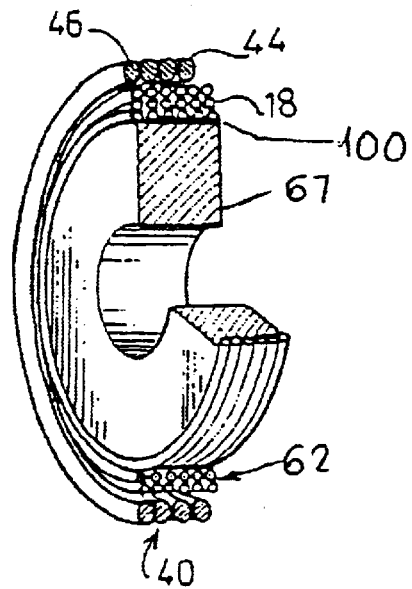
FIGS. 11 to 14 are diagrammatic views which show examples of versions of devices for carrying out the step of preheating the core of the rotor according to the invention.
Figure 12:
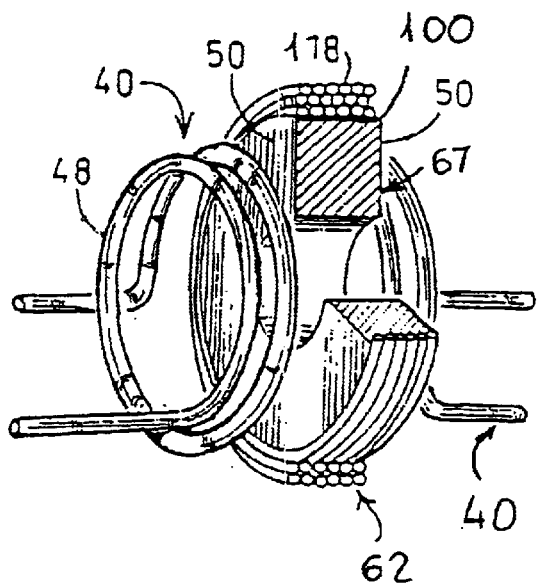

The preheating step is performed by induction in FIGS. 11 and 12, the core being made of magnetic steel such that it will heat up when subjected to an alternating magnetic field.

In FIG. 11, an inductive winding 40 surrounds the winding 118 which is mounted on the core 67 via the electrically insulating leaf. This winding consists of a tubular coil 44, in this example having four turns of a conductive wire 46. The internal diameter of the winding 44 is slightly greater than the external diameter of the winding 62. When the winding 40 is energised with an alternating current, a magnetic field is set up which causes the core 67 to be preheated.

In another version, the core 40 consists of a spiral winding which is located close to a side face of the core. In order to optimise the preheating of the core, and as can be seen in FIG. 12, a winding 40, with a spiral coil 48, is arranged close to each side face 50 of the core 67.

In another version of course, the winding 62 is used as the inductive coil. This also applies to the winding 32.

The conductive element of the winding 62 is energised during the preheating step with an alternating current which is for example lower than 50A, so as to control the Joule effect heating of the conductive element. During the step of changing state, the conductive element is energised by a direct current of higher intensity (>30A), so as to give a rapid change in the state of the connecting material.

In a further version, the conductive element is energised during the preheating step by a direct current so that the conductive element of the winding is thereby heated to a temperature lower than the hardening temperature of the connecting element, and then, as before, by another direct current which is of higher intensity so as to enable the conductive element to be heated to a temperature greater than that of the connecting element. The temperature change pattern is thus closely controlled.

Figure 13:
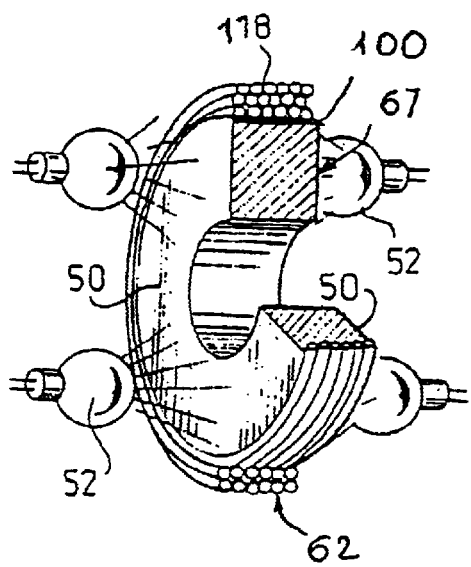

In FIG. 13, preheating of the core 67 is obtained by means of an infrared emitter 52 fitted close to the side faces 50 of the core 67.

Figure 14:
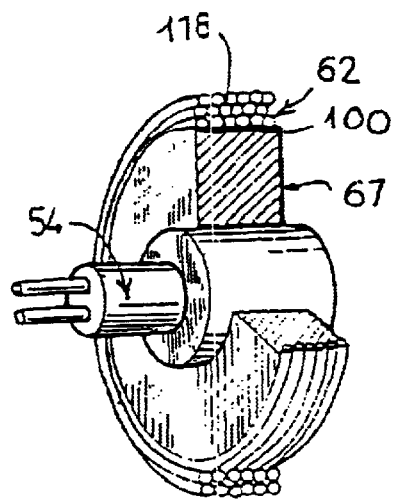

Of course, and as can be seen in FIG. 14, the preheating device 54, which may for example be of the heating resistor type, is located in the central aperture of the core 67.

These arrangements are applicable to the stator 14 and to its winding 32. Above all, they are of course relevant to the core 67 of the rotor, because the winding which it carries is deeper so that the temperature gradient effects are greater.

Such a step can be omitted, especially where the leaf 100 is not a thermal conductor, and/or where the depth of the winding is smaller.

What is claimed is:

1. A rotary electrical machine comprising at least one member (14, 16) on which at least one electrical winding (32, 62) is formed, the winding comprising at least one electrically conductive element (34) which is wound in such a way as to form the winding and which is coated with at least one layer (36) of electrically insulating material, wherein, prior to the winding step, the coated conductive element (34) is clad with a connecting layer (72) consisting of at least one connecting material (73) that joins together adjacent portions of the coated electrically conductive element (34), and wherein an electrically insulating leaf (44, 100) is interposed between the winding (32, 62) and the member (14, 16) on which the winding (32, 62) is formed, and and wherein the insulating leaf (44, 100) comprises an electrically insulating structural element (74), on at least one of the faces of which a second connecting material (76) is applied at least partially, whereby to join the insulating leaf (44) to at least one of the winding (32, 62) and the member (14, 16) on which the winding (32, 62) is formed.

2. A rotary electrical machine according to claim 1, characterised in that the structural element (74) is at least partially impregnated by the second connecting material (76).

3. A rotary electrical machine according to claim 1, characterised in that the second connecting material (76) is identical to the first connecting material (73).

4. A rotary electrical machine according to claim 1, characterised in that the structural element (74) is a leaf of electrically insulating paper.

5. A rotary electrical machine according to claim 1, characterised in that the structural element (74) is made of electrically insulating cloth.

6. A rotary electrical machine according to claim 1, characterised in that at least one of the connecting materials (73, 76) comprises a polymer.

7. A rotary electrical machine according to claim 6, characterised in that the polymer is of the thermoplastic type.

8. A rotary electrical machine according to claim 6, characterised in that the polymer is of the thermoplastic type, the melting point of which is higher than the maximum working temperature of the rotary electrical machine.

9. A rotary electrical machine according to claim 1, characterised in that the member (14, 16) on which at least one winding (32, 62) is formed is a stator (14).

10. A rotary electrical machine according to claim 1, characterised in that the member (14, 16) on which at least one winding (32, 62) is formed is a rotor (16).

11. A rotary electrical machine according to claim 1, characterised in that it is an alternator (10).

* * * * *